(12) United States Patent
Kenderov

(10) Patent No.: US 7,801,523 B1
(45) Date of Patent: Sep. 21, 2010

(54) SYSTEM, METHOD, AND COMPUTER PROGRAM PRODUCT FOR CHARGING A ROAMING NETWORK FOR A CHARGEABLE EVENT

(75) Inventor: Stoyan Kenderov, San Francisco, CA (US)

(73) Assignee: Amdocs Software Systems Limited, Dublin 2 (IE)

( * ) Notice: Subject to any disclaimer, the term of this patent is extended or adjusted under 35 U.S.C. 154(b) by 649 days.

(21) Appl. No.: 11/745,972

(22) Filed: May 8, 2007

(51) Int. Cl.
*H04W 4/00* (2009.01)
(52) U.S. Cl. .................. 455/432.3; 455/432.1; 455/406
(58) Field of Classification Search ...... 455/432.1–433, 455/405–409
See application file for complete search history.

(56) References Cited

U.S. PATENT DOCUMENTS

| | | | |
|---|---|---|---|
| 7,096,015 B2 | 8/2006 | Bridges et al. | 455/432.1 |
| 2002/0052754 A1 | 5/2002 | Joyce et al. | 705/1 |
| 2004/0058652 A1* | 3/2004 | McGregor et al. | 455/67.13 |
| 2004/0132449 A1* | 7/2004 | Kowarsch | 455/432.1 |
| 2004/0203750 A1 | 10/2004 | Cowdrey et al. | 455/432.1 |
| 2005/0197867 A1* | 9/2005 | Edgett et al. | 705/5 |
| 2008/0046963 A1* | 2/2008 | Grayson et al. | 726/1 |

\* cited by examiner

*Primary Examiner*—Jean A Gelin
*Assistant Examiner*—Nathan Taylor
(74) *Attorney, Agent, or Firm*—Zilka-Kotab, PC

(57) ABSTRACT

A system, method, and computer program product are provided for charging a roaming network. In use, a home network identifies a chargeable event that is attributable to a roaming network. To this end, the roaming network may be charged for the chargeable event.

15 Claims, 6 Drawing Sheets

SYSTEM, METHOD, AND COMPUTER PROGRAM PRODUCT FOR CHARGING A ROAMING NETWORK FOR A CHARGEABLE EVENT

FIELD OF TILE INVENTION

The present invention relates to network usage, and more particularly to charging for network usage and related events.

BACKGROUND

Network service operators often compete and provide network services in certain markets which fit with their overall strategy and economic goals. However, in order to provide an ubiquitous and seamless service to customers in areas different than what the service operators directly cover, such operators typically forge partnerships with other (potentially competing) operators who cover those other areas. Such relationships between operators are known as roaming relationships. It is not uncommon for an operator to maintain several hundred of individual roaming relationships.

When a user of an operator's network (i.e. home network) is roaming on another network (i.e. roaming network), the user essentially uses the capacity and the services of the roaming network. As a result, the roaming network may send an invoice to the home network regarding the user's roaming use. For example, such invoice may include all delivered calls, data transfers, short messages, and/or other services used by the user while roaming.

Frequently, users who are roaming on a roaming network call their home network customer care desk for problems they may experience while roaming. Such problems may be call drops, data service disruptions, and/or inability to execute an application, for example. In such case, the home network may not be responsible for the low quality of service dale roaming network. However, the home network may still have to pay, not only the roaming network for the roaming usage of the user, but also for the customer care calls that the home network handled, even though the problems may have originated with the roaming network.

There is thus a need for addressing these and/or other issues associated with the prior art.

SUMMARY

A system, method, and computer program product are provided for charging a roaming network. In use a home network identities a chargeable event that is attributable to a roaming network. To this end, the roaming network may be charged for the chargeable event.

DETAILED DESCRIPTION

Figure 1:
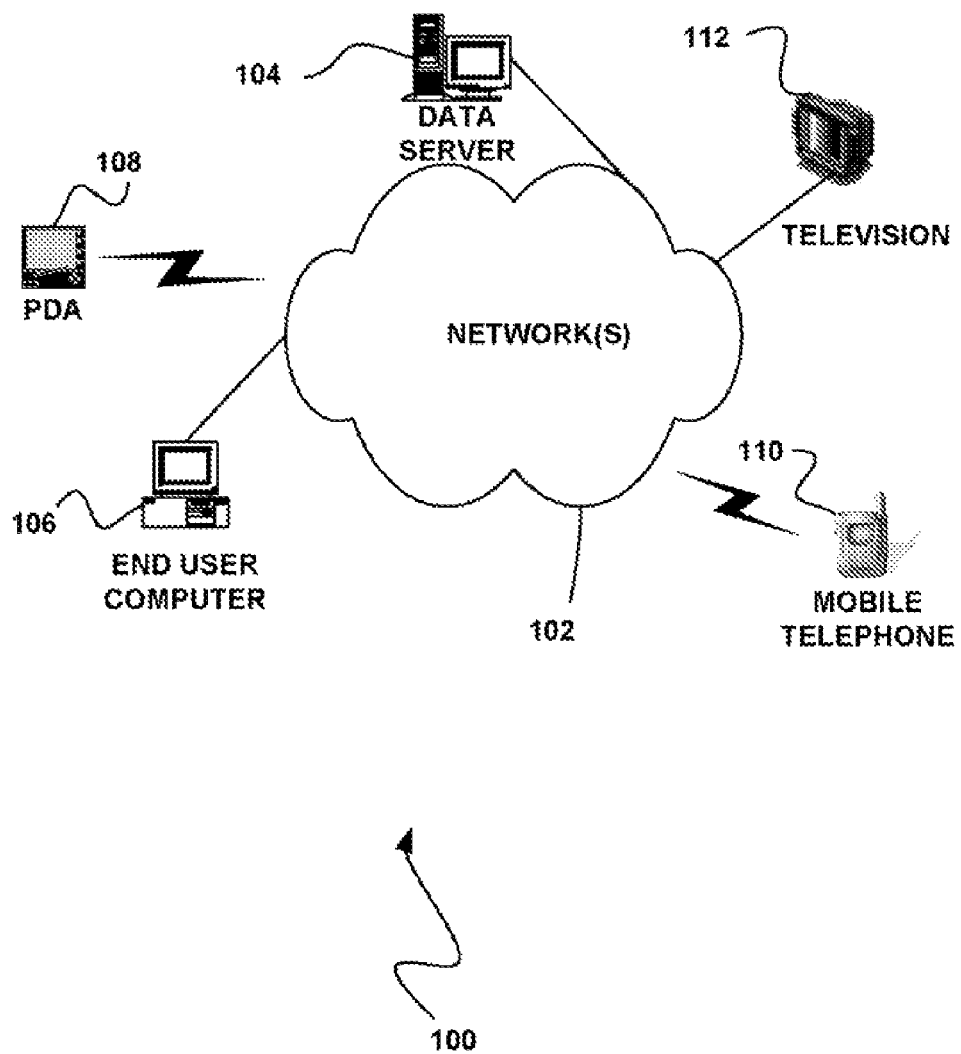
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
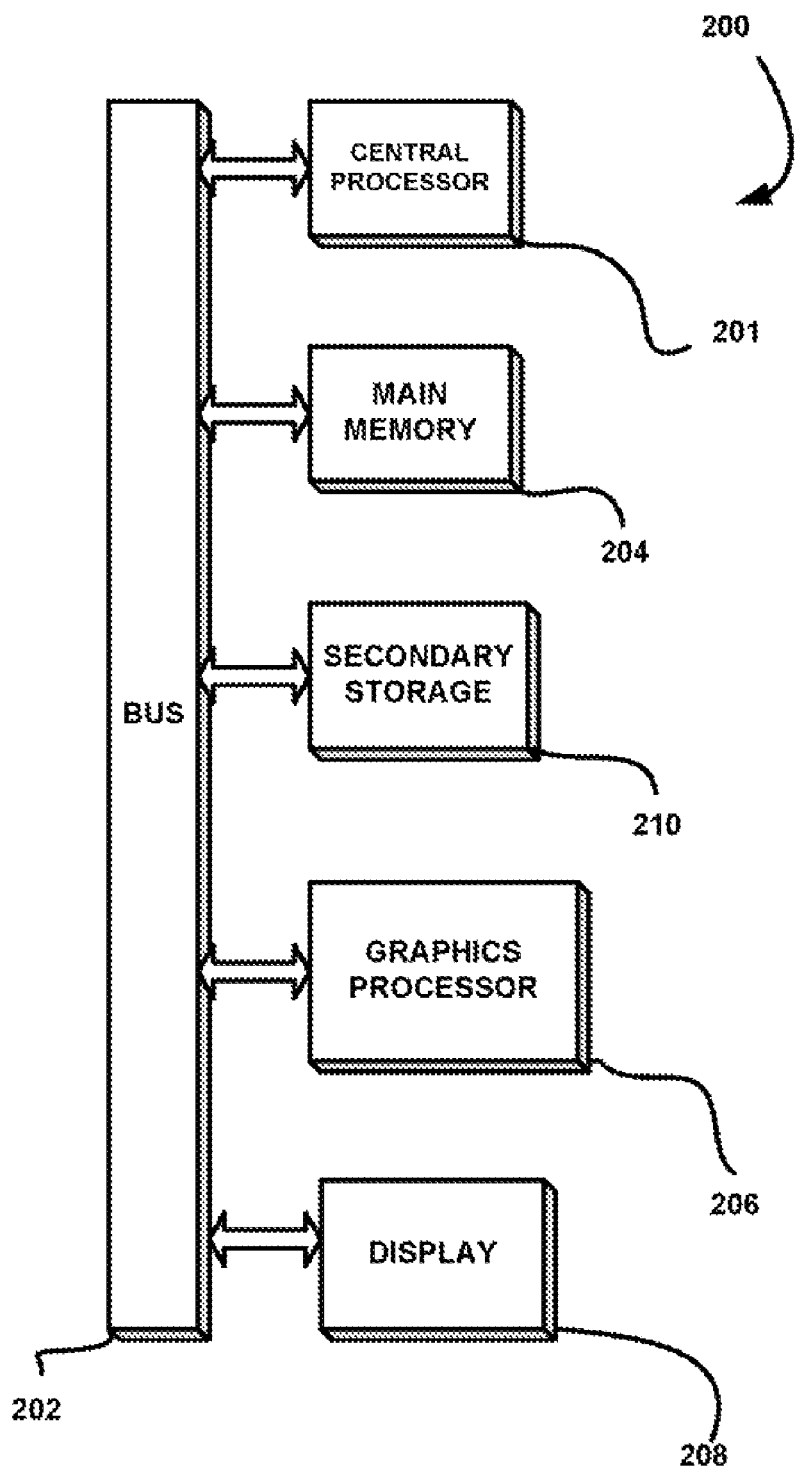
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 240 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204 and/or the secondary storage 210. Such computer programs, when executed, enable the system 200 to perform various functions (to be set forth below, for example). Memory 204, storage 210 and/or any other storage are possible examples of computer-readable media.

Figure 3:
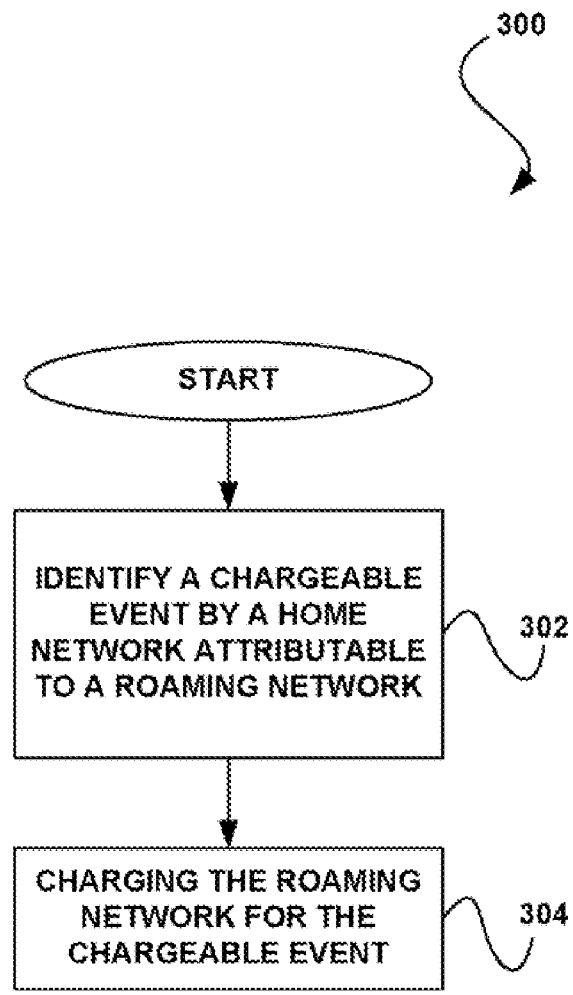
FIG. 3 shows a method for charging a roaming network, in accordance with one embodiment.

FIG. 3 shows a method 300 for charging a roaming network, in accordance with one embodiment. As an option, the method 300 may be implemented in the context of the details of FIGS. 1 and/or 2. Of course, however, the method 300 may be carried out in any desired environment. Further, the aforementioned definitions may equally apply to the description below.

As shown in operation 302, a chargeable event is identified by a home network that is attributable to a roaming network'. In the context of the present description, a chargeable event refers to any event for which one may be charged. For example, in various embodiments, a chargeable event may include, but is not limited to a predefined event, a quality of service level (e.g. falling below a threshold, etc.), user complaints of service, and/or any other chargeable event that meets the above definition.

Further, in the context of the present description, a home network refers to any service network. For example, in various embodiments, a home network may include, but is not limited to any wireless, cellular, 2G, 3G, 4G, Wi-Fi, WiMax, DVB-H, and wireline network, and/or any other network that meet the above definition. Additionally, a roaming network refers to any network other than the home network. Of course, the home network and the roaming network may or may not be similar types of networks.

It should be noted that the chargeable event may be identified in any of a variety of ways. In one embodiment, the chargeable event may be identified based on a user of the roaming network contacting a customer service center of the home network regarding a quality of service of the roaming network. In another embodiment, such chargeable event may be identified based on an agreement between the home network and the roaming network. It should be noted that the foregoing examples are set forth for illustrative purposes only and should not be construed as limiting in any way, since the chargeable event may be identified in any manner that allows for the charging thereof.

As shown in operation 304, the roaming network is charged for the chargeable event. In one embodiment, such charge may be addressed in the form of a payment to the home network from the roaming network. In another embodiment, such charge may be in the form of credit to the home network from the roaming network to be used in future transactions between the parties.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
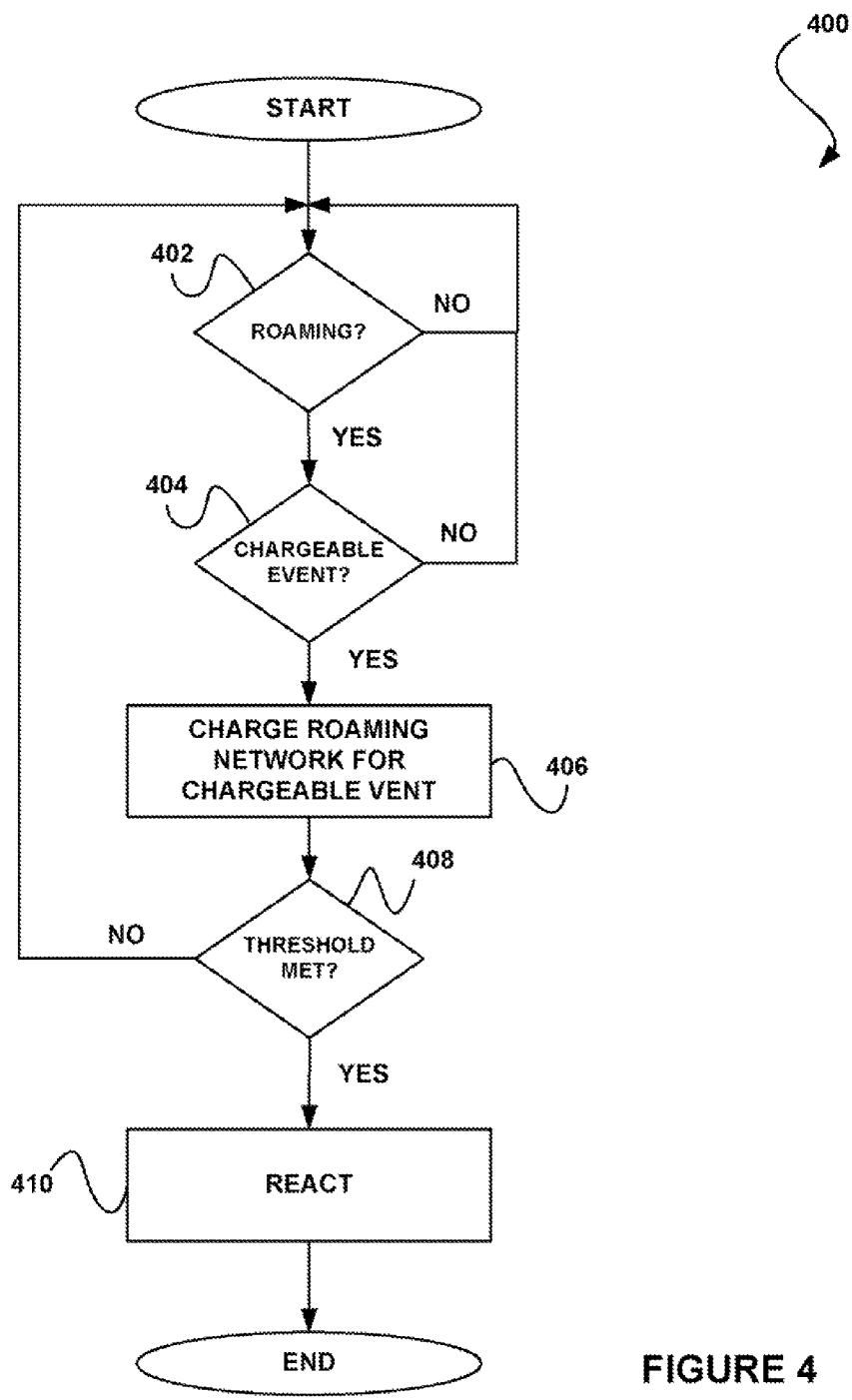
FIG. 4 shows a method for charging a roaming network, in accordance with another embodiment.

FIG. 4 shows a method 400 for charging a roaming network, in accordance with another embodiment. As an option, the method 400 may be implemented in the context of the details of FIGS. 1-3. Of course, however, the method 400 may be carried out in any desired environment. Further, the aforementioned definitions may equally apply to the description below.

As shown in decision 402, it is determined if a user is roaming. In the context of the present embodiment, roaming refers to usage of a service in a location that is different from a home network area where the user's service originated and/or was registered in various embodiments, roaming may include, but is not limited to regional roaming, national roaming, international roaming, inter-standards roaming, and/or any other roaming that meet the above definition.

In one embodiment, roaming may occur when a user of a first wireless service uses the facilities of a second wireless service provider. The second wireless service provider may not necessarily have a pre-existing financial agreement or service agreement with the user. In this case, the first and the second service provider may have an agreement which allows the users of the first service provider to utilize the facilities of the second service provider, while the user is within the second service provider's area of coverage.

As shown in decision 404, if it is determined that a user is roaming, it is then determined if there has been a chargeable event. In one embodiment, the chargeable event may include a customer service provided by the home network which is attributable to the roaming network. For example, such customer service provided by the home network may be addressing customer concerns/calls regarding a service characteristic attributable to the roaming network.

In one embodiment, the customer service provided by the home network may be prompted by a quality of service of the roaming network. In such case, the user may be experiencing problems such as service disruptions (e.g. call drops) or the inability to execute an application. As a result, the user may decide to call a representative of the user's home network to remedy the problem, for example. Again, such exemplary chargeable event is set forth for illustrative purposes only, as any chargeable event may apply.

Thus, the home network may be forced to address issues regarding the quality of service of the roaming network. In such case, the customer service provided by the home network may be determined to be a chargeable event. If it is determined that the user is roaming and there has been a chargeable event, the roaming, network is charged for the chargeable event, as shown in operation 406.

in one embodiment, a payment by the roaming network may be rendered to the home network, in response to the charge. Furthermore, the roaming network may be charged in accordance with an agreement. Such agreement may be between the roaming network and the home network, for example.

In another embodiment, a plurality of chargeable events may be tracked. Additionally, as shown in operation 408, the tracked chargeable events may be compared to a threshold. Such threshold may be determined in a variety of ways.

In one embodiment, such threshold may be based on a standard quality of service set forth in the particular service area (e.g. an industry standard). In another embodiment, the threshold may be set forth in an agreement between the home network and the roaming network such as a service level agreement (SLA). For example, the home network may have specified in the agreement between the parties an expected quality of service from the roaming network.

Further, as shown in operation 410, there may be a reaction to the threshold being met. For example, in one embodiment, the quality of service of the roaming network may be monitored. In turn, the monitored quality of service of the roaming network may be compared to a threshold quality of service. Thus, when the quality of service of the roaming network drops below a certain threshold, the home network may choose to react to the quality of service dropping below the threshold.

In one embodiment, such reaction may include terminating a relationship between the roaming network and the home network based on the comparison of the quality of service and the threshold. For example, in the agreement, the home network and the roaming network may have specified a limit to the number of complaints and/or customer service calls based on the quality of service for the roaming network. Further, the home network may have specified in the agreement that the agreement may be terminated if a certain number of complaints and/or service calls were received exceeding this limit. Thus, upon meeting the threshold specified in the agreement, the relationship between the parties may be terminated.

In another embodiment, an additional chargeable event may be identified based on the comparison of the monitored quality of service of the roaming network and the threshold of the quality of service. The threshold quality of service may represent an acceptable standard of quality of service as specified by the home network, for example. In such case, the additional chargeable event may include the quality of service of the roaming network falling below the threshold or a number of chargeable events rising above the threshold.

For example, the home network and the roaming network may have an agreement which specifies criteria for determining if the roaming network is maintaining a quality of service which the home network expects. In such case, such agreement may include measurable parameters for determining if the roaming network is meeting the expected quality of service. Such measurable parameters may include user complaints or service calls to the home network addressing the quality of service while roaming, for example.

Thus, if the number of complaints or calls regarding the roaming service reaches the threshold determined by the parties in the agreement, the home network may choose to penalize the roaming network in some way. For example, in various embodiments, the penalties may include monetary penalties, suspension of payment, and reverse charges, etc. Of course, penalties are just an example of an action that may be taken by the home network and may be a part of another reaction which involves remedying situations where chargeable events are occurring regularly.

It should be noted that operations 402-406 of FIG. 4 may or may not be implemented independently from operations 408-410. In one embodiment, the home network may only be interested in charging for individual chargeable events. In such case, the roaming network may be charged for a chargeable event upon determination that the user is roaming and a chargeable event has occurred (e.g. see operations 402-406). In another embodiment, the home network may only desire that the chargeable events be tracked, compared to the threshold, and once the threshold is met, an action may be taken as a result (e.g. see operations 408-410). In still another embodiment, and as shown in FIG. 4, operations 402-410 may be implemented concurrently.

In one embodiment, the chargeable events may be user complaints or calls relating to the quality of service of the roaming network. Thus, by tracking these chargeable events, the home network may be able to determine whether there is an action that may be taken to address such events. Such action may include determining whether the home network should provide service in place of the roaming network based on the tracked chargeable events. Similarly, such action may include determining whether the home network should extend service to particular areas, based on the tracked chargeable events. Such determination may be made in real-time or near real-time in order to more efficiently address the events.

In one embodiment, such determination may involve providing a map of areas the home network should provide service in place of at least one roaming network. For example, if the tracked events indicate that certain roaming networks have areas where users are repeatedly having problems with service quality, the home network may decide that it would be useful to extend the home network service to at least those areas and possibly the surrounding areas.

In another embodiment, such determination may include a prioritization of areas the home network should provide service in place of at least one roaming network. For example, the tracked events may indicate that certain roaming networks have areas where users are repeatedly having problems with service quality more than other roaming networks. In this case, the home network may desire that the prioritization be based on the areas which are more likely to have issues with the quality of service.

In still another embodiment, such prioritization may be based on a cost/benefit analysis. For example, there may be an area of the roaming network which has quality of service issues with a large number of users. Thus, by providing extended service in this area, the home network may be able to affect the quality of service for a larger number of users than another area which is having issues with the quality of service for a smaller number of users.

Figure 5:
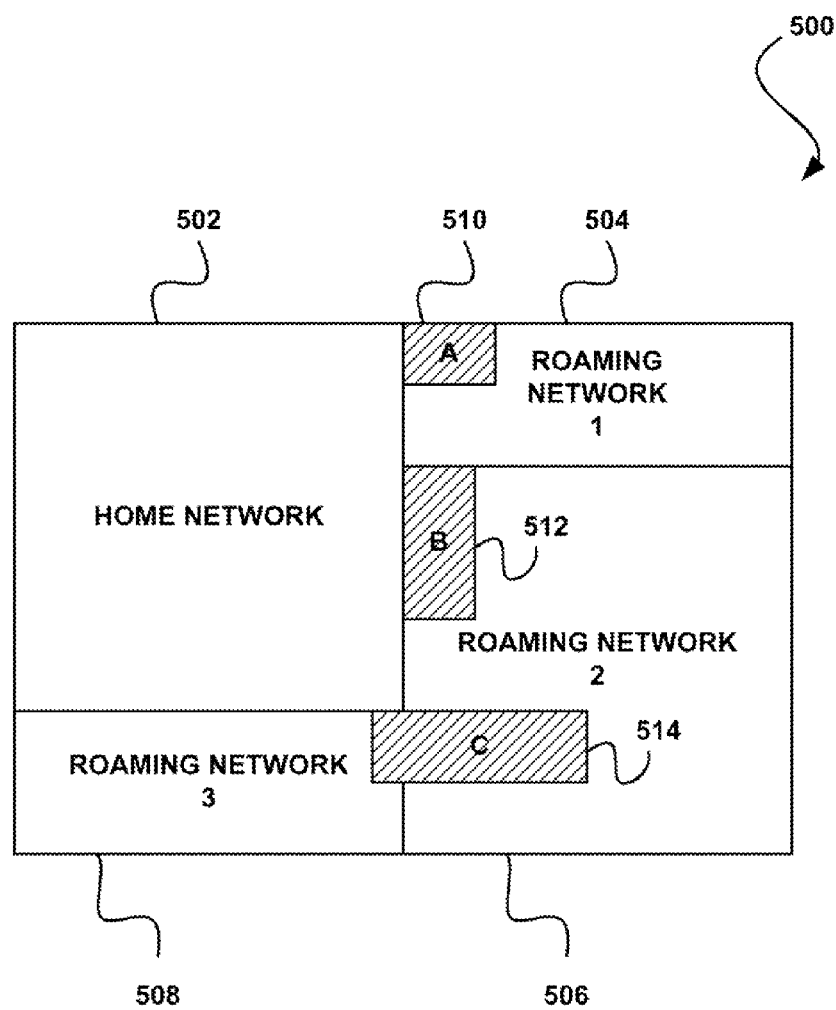
FIG. 5 shows a map for identifying areas where service coverage may be extended, in accordance with one embodiment.

FIG. 5 shows a map 500 for identifying areas where service coverage may be extended, in accordance with one embodiment. As an option, the map 500 may be implemented in the context of the details of FIGS. 1-4. Of course, however, the map 500 may be carried out in any desired environment. Further, the aforementioned definitions may equally apply to the description below.

As shown, a home network 502 is provided in addition to a plurality of roaming networks 504-508. In one embodiment, the map 500 may be an example of the area surrounding the home network 502. In such case, it may be determined from tracking chargeable events that there are certain areas of the roaming networks 504-508 that have issues with the quality of service from the roaming networks 504-508 (e.g. areas 510-514).

For example, it may be determined, based on tracked chargeable events, that a first roaming network 504 may have an area 510 where users of the home network 502 have issues with the quality of service. Similarly, it may be determined based on tracked chargeable events that a second roaming network 506 has an area 512 where users of the home network 502 have issues with the quality of service in this case, the map 500 may be utilized to determine what type of action may be taken regarding the chargeable events.

In one embodiment, the home network 502 may use the map 500 in order to determine areas in which service should be extended. For example, it may be determined that the home network 502 should extend coverage into the first and second roaming networks 504 and 506 so that the areas 510 and 512 will be included in the home network 502. Similarly, it may be determined based on the tracked chargeable events that the home network 502 should extend coverage into all of the first and second roaming networks 504 and 506, based on the map 500.

In another embodiment, the map 500 may be used to show prioritized areas based on where chargeable events have occurred. For example, the areas 510 and 512 in the first and second roaming networks 504 and 506 may be prioritized in such a way as to indicate the area. Which may have the most quality of service issues. As shown, the areas 510-514 have a ranking illustrating the priority of the areas based on certain criteria (e.g. A corresponding to a higher priority area than B, etc). Thus, by utilizing the map 500, the home network may more readily determine the areas where extension of service may be beneficial. Of course, the prioritization of areas 510-514 may be shown in a variety of fashions and is shown using alphabetic prioritization for illustrative purposes only.

Additionally, the prioritization of the areas may be based on a variety of issues, such as the number of users affected by the quality of the roaming service in the area. For example, the area 510 may be prioritized higher than the area 512 because more customers have experienced problems in the area 510. In another embodiment, the prioritization may be based on the severity of the problems experienced.

For example, the area 510 may be experiencing interruptions in service, whereas another area 514 may be experiencing poor quality in data transmission. As a result, it may be determined by the home network that remedying the issues in the area 510 may be more feasible and/or cost effective than remedying the issues in the area 514 at that particular time.

In one embodiment, the prioritization may be based on a cost/benefit analysis. For example, the area 510 and the area 514 may be experiencing the same issues and have a similar number of chargeable events occurring. However, because the area 514 involves the second roaming network 506 and the third roaming network. 508, and the area 510 only involves the first roaming network 504, it may be more cost effective for the home network to address the issues in the area 510.

In another embodiment, the map 500 may be used to structure agreements between the home network 502 and the plurality of roaming networks 504-508. For example, the home network 502 may use the map 500 to track the chargeable events and determine areas where issues exist in the roaming networks (e.g. the areas 510-514). The home network 502 may then use the map 500 to work out terms in a service level agreement between the home network 502 and the roaming networks 504-508. Such terms may include quality of service thresholds in the areas 510-514, for example.

In another embodiment, the map 500 may be used to determine areas where the roaming networks 504-508 will be charged automatically for use by a user of the home network 502. For example, it may be determined that providing service by the home network 502 in the areas 510-514 may not be feasible. Likewise, the roaming networks 504-508 may not have the means and/or desire to address issues in the areas 510-514. Thus, the home network 502 may establish, based on the map 500, that the roaming networks 504-508 should be charged for the lack of quality of service in the areas 510-514. Similarly, the home network 502, may utilize the map 500 to determine a reduction in the price of a roaming price agreement between the parties.

Figure 6:
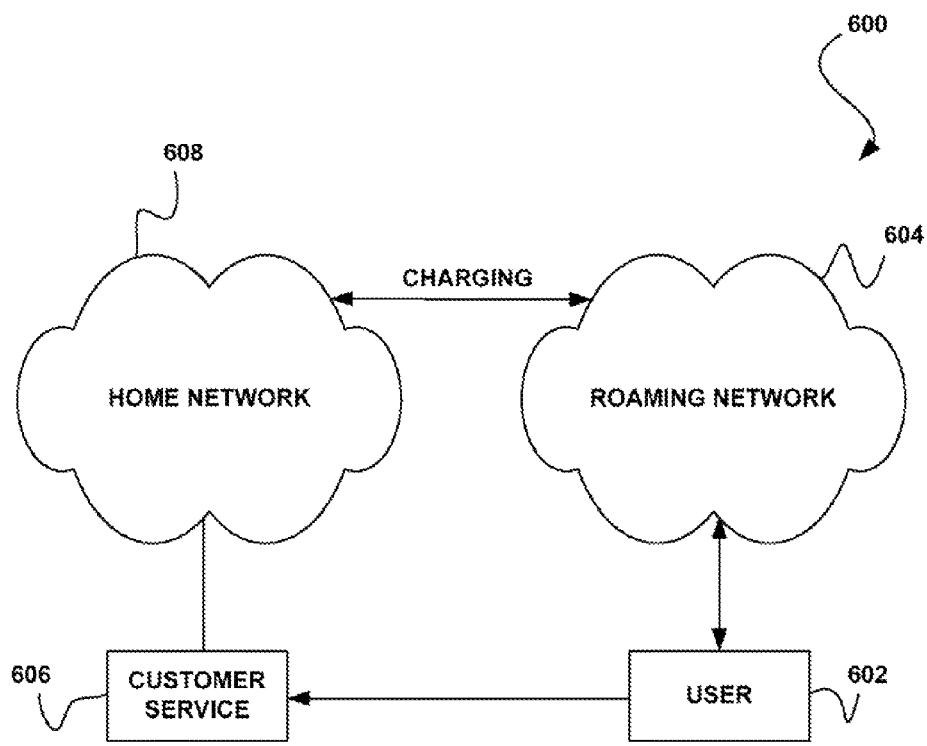
FIG. 6 shows a system for charging a roaming network, in accordance with one embodiment.

FIG. 6 shows a system 600 for charging a roaming network, in accordance with one embodiment. As an option, the system 600 may be implemented in the context of the details of FIG. 1-5. Of course, however, the system 600 may be carried out in any desired environment. Further, the aforementioned definitions may equally apply to the description below.

As shown, a user 602 of a home network 608 utilizes a roaming network 604. During use, the user 602 may experience issues with the roaming network 604. Such issues may include loss of service, poor data transition, or other service quality issues. Thus, the user 602 may choose to address such issues of the roaming network 604 with a customer service representative or department 606 of the home network 608. In such case, the home network 608 will be using their own resources to address issues of the roaming network 604.

By using resources of the home network 608 to address issues of the roaming network 604, the home network 608 may determine that the roaming network 604 should be charged for the event. Thus, once the home network 608 has addressed the issues of the user 602, the home network 608 may charge the roaming network 604 for the chargeable event. Additionally, the home network 608 may track the chargeable event.

Further, if the complaint or inquiry from the user 602 to the customer service center or representative 606 causes a number of tracked chargeable events to exceed a certain threshold, the home network 608 may choose to act in response. For instance, the home network 608 may charge a penalty to the roaming network 604, or terminate the agreement between the home network 608 and the roaming network 604, as discussed above.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   identifying a chargeable event by a home network that is attributable to a roaming network; and
   charging the roaming network for the chargeable event;
   wherein the chargeable event includes a customer service provided by the home network;
   wherein the customer service provided by the home network is prompted by a quality of service of the roaming network;
   wherein the quality of service of the roaming network is monitored;
   wherein the monitored quality of service of the roaming network is compared to a threshold quality of service;
   wherein the chargeable event is identified based on the comparison.

2. The method of claim 1, wherein the chargeable event includes the quality of service of the roaming network falling below the threshold.

3. The method of claim 1, wherein a relationship between the roaming network and the home network is terminated based on the comparison.

4. The method of claim 1, wherein payment by the roaming network is rendered to the home network.

5. The method of claim 1, wherein the roaming network is charged for the chargeable event in accordance with an agreement.

6. The method of claim 5, wherein the agreement is between the roaming network and the home network.

7. The method of claim 1, wherein a plurality of the chargeable events are tracked.

8. The method of claim 7, wherein it is determined whether the home network should provide service in place of the roaming network, based on the tracked chargeable events.

9. The method of claim 8, wherein an output of the determination includes a map of areas the home network should provide service in place of at least one roaming network.

10. The method of claim 8, wherein an output of the determination includes a prioritization of areas the home network should provide service in place of at least one roaming network.

11. The method of claim 8, wherein the determination is carried out in real time.

12. The method of claim 1, wherein the home network and the roaming network are wireless networks.

13. A computer program product embodied on a computer readable medium, comprising:
   computer code for identifying a chargeable event that is attributable to a roaming network; and
   computer code for charging the roaming network for the chargeable event;
   wherein the chargeable event includes a customer service provided by the home network;
   wherein the computer program product is operable such that the customer service provided by the home network is prompted by a quality of service of the roaming network;
   wherein the computer program product is operable such that the quality of service of the roaming network is monitored;
   wherein the computer program product is operable such that the monitored quality of service of the roaming network is compared to a threshold quality of service;
   wherein the computer program product is operable such that the chargeable event is identified based on the comparison.

14. A system, comprising:
   a home network for identifying a chargeable event that is attributable to a roaming network, and charging the roaming network for the chargeable event;
   wherein the chargeable event includes a customer service provided by the home network;

wherein the system is operable such that the customer service provided by the home network is prompted by a quality of service of the roaming network;

wherein the system is operable such that the quality of service of the roaming network is monitored;

wherein the system is operable such that the monitored quality of service of the roaming network is compared to a threshold quality of service;

wherein the system is operable such that the chargeable event is identified based on the comparison.

15. The method of claim 1, wherein the chargeable event includes a user of the home network calling a representative of the home network in response to the user experiencing, with respect to the roaming network, at least one of service disruptions and an inability to execute an application.

* * * * *